US011154441B2

(12) United States Patent
Cardona et al.

(10) Patent No.: US 11,154,441 B2
(45) Date of Patent: Oct. 26, 2021

(54) MOBILITY RESTRAINT DEVICE TENSIONER

(71) Applicant: Valeda Company, Oakland Park, FL (US)

(72) Inventors: Edgardo Cardona, Pompano Beach, FL (US); Patrick Girardin, Fort Lauderdale, FL (US)

(73) Assignee: Valeda Company, LLC, Oakland Park, FL (US)

( * ) Notice: Subject to any disclaimer, the term of this patent is extended or adjusted under 35 U.S.C. 154(b) by 340 days.

(21) Appl. No.: 16/420,342

(22) Filed: May 23, 2019

(65) Prior Publication Data

US 2019/0274903 A1 Sep. 12, 2019

Related U.S. Application Data

(63) Continuation of application No. 15/284,441, filed on Oct. 3, 2016, now Pat. No. 10,342,719.

(Continued)

(51) Int. Cl.
*A61G 3/08* (2006.01)
*B60P 7/08* (2006.01)
(Continued)

(52) U.S. Cl.
CPC ......... *A61G 3/0808* (2013.01); *A61G 3/0875* (2013.01); *B60P 7/083* (2013.01);
(Continued)

(58) Field of Classification Search
CPC ........... B60P 7/083; B60P 7/06; B60P 7/0853; A61G 3/0808; A61G 3/0875; B60R 9/08; F16D 7/025; F16D 41/12; F16D 47/04
See application file for complete search history.

(56) References Cited

U.S. PATENT DOCUMENTS 3,245,660 A * 4/1966 Ratcliff ................... B66D 3/14
254/369
4,106,754 A 8/1978 Kucher
(Continued)

FOREIGN PATENT DOCUMENTS

DE   102006023028   12/2007
EP      1414671 A1    5/2004
GB      2455290 A     6/2009

OTHER PUBLICATIONS

International Search Report and Written Opinion dated Dec. 19, 2016 in co-pending PCT Appl. No. PCT/US2016/055228.

(Continued)

*Primary Examiner* — Michael E Gallion
(74) *Attorney, Agent, or Firm* — Daniel Tallitsch

(57) ABSTRACT

A tensioning device is provided for tensioning a retractor in a wheelchair securement system. The tensioning device may include a clutch assembly for communicating rotational movement of a handle to a drive shaft operably connected to the spool of the retractor. The clutch assembly may include a pawl operably connected to the handle, which pawl communicates rotational movement of the handle to a drive sprocket. The clutch assembly may also include a friction member which communicates rotation of the drive sprocket to the drive shaft up to a predetermined amount of rotational force. If the rotational force exceeds the predetermined amount, the friction member will slip and cease to transfer rotational movement from the drive sprocket to the drive shaft. The clutch assembly may also include a compression member for compressing the friction member and drive sprocket whereby the predetermined amount of force may be adjusted.

20 Claims, 8 Drawing Sheets

Related U.S. Application Data

(60) Provisional application No. 62/236,832, filed on Oct. 2, 2015.

(51) Int. Cl.
  *B60R 9/08* (2006.01)
  *F16D 7/02* (2006.01)
  *F16D 41/12* (2006.01)
  *F16D 47/04* (2006.01)
  *B60P 7/06* (2006.01)

(52) U.S. Cl.
  CPC ............... *B60R 9/08* (2013.01); *F16D 7/025* (2013.01); *F16D 41/12* (2013.01); *F16D 47/04* (2013.01); *B60P 7/06* (2013.01)

(56) References Cited

U.S. PATENT DOCUMENTS

| | | | |
|---|---|---|---|
| 4,723,757 A | 2/1988 | Steinman et al. | |
| 5,186,429 A * | 2/1993 | Linnepe | B60S 9/04 |
| | | | 248/354.1 |
| 5,316,266 A | 5/1994 | Chou | |
| 5,628,595 A * | 5/1997 | Harris | B60P 7/0807 |
| | | | 410/4 |
| 6,007,053 A | 12/1999 | Huang | |
| 6,135,685 A | 10/2000 | Anthony et al. | |
| 6,799,751 B1 * | 10/2004 | Anderson | B60P 7/083 |
| | | | 24/68 CD |
| 6,929,438 B1 | 8/2005 | Foster et al. | |
| 7,503,736 B1 | 3/2009 | Chen | |
| 7,845,621 B1 | 12/2010 | Lu | |
| 7,891,641 B1 | 2/2011 | Miller | |
| 8,348,239 B2 | 1/2013 | Chou | |
| 8,434,979 B1 | 5/2013 | Genge | |
| 8,967,595 B2 * | 3/2015 | Chou | B60P 7/083 |
| | | | 254/223 |
| 10,173,871 B2 * | 1/2019 | Hallen | B66D 3/14 |
| 10,342,719 B2 * | 7/2019 | Cardona | F16D 41/12 |
| 2003/0111650 A1 | 6/2003 | Gleinser | |
| 2003/0190208 A1 | 10/2003 | Cardona et al. | |
| 2006/0151765 A1 * | 7/2006 | Kazerooni | B60R 5/04 |
| | | | 254/275 |
| 2006/0249617 A1 | 11/2006 | Cardona | |
| 2007/0056814 A1 | 3/2007 | Michel et al. | |
| 2007/0151812 A1 | 7/2007 | Michel et al. | |
| 2007/0221897 A1 | 9/2007 | Cardona | |
| 2010/0001243 A1 | 1/2010 | Amoss et al. | |
| 2010/0193755 A1 | 8/2010 | Klasing et al. | |
| 2014/0117137 A1 | 5/2014 | Diamond | |
| 2016/0143400 A1 | 5/2016 | Latuszek et al. | |
| 2016/0347233 A1 * | 12/2016 | Kingery | B60P 7/083 |
| 2017/0328421 A1 | 11/2017 | Ahmad | |
| 2018/0162288 A1 * | 6/2018 | Sautter | B60R 9/0426 |

OTHER PUBLICATIONS

Notice of Allowance, Interview Summary, and Notice of References dated Apr. 11, 2019 in U.S. Appl. No. 15/284,441.

Office Action and Notice of References dated May 30, 2018 in U.S. Appl. No. 15/284,441.

Office Action dated Jan. 7, 2019 in U.S. Appl. No. 15/284,441.

\* cited by examiner

MOBILITY RESTRAINT DEVICE TENSIONER

CROSS-REFERENCE TO OTHER APPLICATIONS

This application is a continuation of U.S. patent application Ser. No. 15/284,441, filed on Oct. 3, 2016, which claims priority to U.S. Provisional Patent Application No. 62/236,832, which was filed on Oct. 2, 2015.

The disclosures of U.S. patent application Ser. Nos. 15/284,441, 62/236,832, U.S. Pat. No. 9,107,786, and U.S. Patent Publication No. 2014-0334893 are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

Technical Field

The embodiments described and claimed herein relate generally to securing a mobility device (e.g. wheelchair, scooter, stretcher, etc.) using a "tensioner" that induces tension into a restraint to provide greater stabilization while the mobility device is being transported in a vehicle (although it could be used to transport it outside of a vehicle). In one embodiment, the tensioning device induces tension into a designated front restraint (which is attached to a point on a mobility device), and urges the mobility device toward or into contact with a "bumper". The combination of the tensioner and bumper acts to further stabilize the mobility device while being transported. While it could be used in a 4-point mobility device restraint configuration, it is envisioned and most beneficial when used in a 2 or 3-point restraint system configuration, such as those disclosed in U.S. Pat. No. 9,107,786 and U.S. Patent Publication No. 2014-0334893.

Background Art

Historically, mobility device securement systems had been designed with four restraints, one attached to each corner of the mobility device (two in front, two in rear). Recently, new systems have been developed with less than four attachment points (e.g., Q'Straint's Q'Pod and American Seating's Reliant). These systems have used three attachment points instead of four, and they include a tensioning device to help stabilize the mobility device while being transported.

One challenge is vehicle (e.g. bus) wall seating systems are becoming thinner in order to allow for larger aisle clearances; this is important to allow mobility device passengers to maneuver, and others passengers to pass in aisle when mobility device passengers are occupying the securement areas. Often times, two mobility device securement systems (i.e. Q'Pods) are installed side-by-side, and when occupied simultaneously by two mobility device passengers, the clear aisle spacing is limited or non-existent, which causes issues. Also, many vehicle retrofit opportunities pose difficult challenges as there are often times existing fixed obstructions such as heating & cooling ducts and wheel-wells that are impossible or very costly to remove. In these instances, current systems with tensioners are unable to be installed in these applications and the only current alternative is the traditional 4-point system which is less effective, especially in a city bus environment where limiting dwell times are critical.

Various embodiments of the Q'Pod's tensioning devices are disclosed in U.S. Pat. No. 9,107,786 at, for example, FIGS. 5 and 11-15. In the Q'Pod's current design, twisting of handle is required to release the mechanism, which could be awkward for some users. In addition, the twisting action increases the "knuckle clearance" required by certain standards. Knuckle clearance on all sides of the turning handle requires additional space in the bus as the entire device needs to be pushed out further to ensure clearance is met. The overall size of the unit can create installation challenges especially in situations where there are ducts under the flip seats. Finally, the tensioner does not provide a way to limit the amount of tension the user can exert on the restraint.

SUMMARY OF THE PRESENT EMBODIMENTS

Clearly, the prior art devices have limitations which the present embodiments overcome and make for more effective installation and use. For example, the new compact tensioner disclosed herein is thinner and has a smaller footprint, allowing it to be installed on the increasingly thinner seats and reduces the potential interference with existing fixed obstructions. In addition to the smaller size, the new compact tensioner offers a controllable amount of tension of the belt which results in consistent securement of the mobility device for a secure and comfortable ride. Current systems today often provide too much tension on the belt, or too little resulting on a very uncomfortable ride since the mobility devices will be moving side to side as the vehicle is moving.

The compact tensioner is part of a mobility device and occupant restraint system such as the Q'Pod. The typical restraint system comprises a rear barrier with one or more tie downs, a bumper, a front tie down, and the tensioner. The tensioner may be placed in front of the mobility device and under or adjacent a flip seat for engagement with the front tie down.

The compact tensioner has at least two positions/modes: (1) Stow Position; and (2) Tension Mode. Once a mobility device is positioned inside the vehicle and in the park zone, the two rear tie down hooks are attached to the rear of the mobility device and the mobility device is steered into the final position, close to the side bumper. To secure the front of mobility device, the user should ensure that the handle of the compact tensioner is in the stow position—at this point the belt of the front tie down will be in the release mode. The mobility device is then secured with a J hook at the end of the front tie down belt. To enter the Tension Mode, the release button on the tensioner handle is pushed and held while moving the handle down, and then immediately releasing the button. In the Tension Mode, tension can be applied to the belt by cranking the handle. Once the tension on the belt has reached a predetermined amount of load, a clutch in the compact tensioner will slip preventing over tension. Shoulder and lap belts can then be secured on the mobility device passenger. Tension on the belt is released by putting the compact tensioner back into in the Stow Position. To put the compact tensioner in the Stow Position, the release button on the handle is pushed and held while moving the handle up, and then immediately releasing the button. Thereafter, the shoulder and lap belt as well as the rear mobility device tie-downs should be disconnected and returned to the stow position before moving the mobility device out.

The compact tensioner may include a number of key features and benefits:

Load limiting action: The device may be equipped with a load limiting device that controls the amount of tension/load that the operator can apply to the restraint and prevents excessive loading to the wheelchair and/or the tensioner.

A compact design (thinner, narrower & smaller footprint overall) may allow for easier and more flexible installation, in more applications/configurations, especially where space is limited, seats are very thin, or fixed obstructions exist like heating/cooling systems, wheel arches, etc. However, critical dimensions like belt opening location may be maintained to keep effective restraint angle. In addition, the compact design may allow for increased belt length which increases ease of securement with certain wheelchairs.

Safety unlock indicator: An indicator (visual or audible) may be used, which alerts the user when the device is not locked. This serves to let user know the system is 'not' locked/secured, which helps to prevent accidental release or a mobility device not being secured before being transported.

Simple/Intuitive Handle & Release: The handle is easy to use and operate. A release 'button' acts similar to parking brake, and as such is very intuitive. In some embodiments, no twisting is required to activate (i.e. no turning handle). A single button release reduces the knuckle clearance required, allowing for 'tighter' installations. By moving handle up and down, tension may be applied to the belt.

Flexible installation: The top mounting plate of the unit can be made to a specific installation situation (i.e., various seats, or to a wall or floor mount)

Load indicator: An audible or visual load indicator may be provided, which alerts the user when the desired tension on the belt has been reached.

Field serviceability (replaceable components): In some embodiments, the unit can be taken apart to replace sub-components such as the Handle, Load Limiting Device, and the Retractor assembly.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
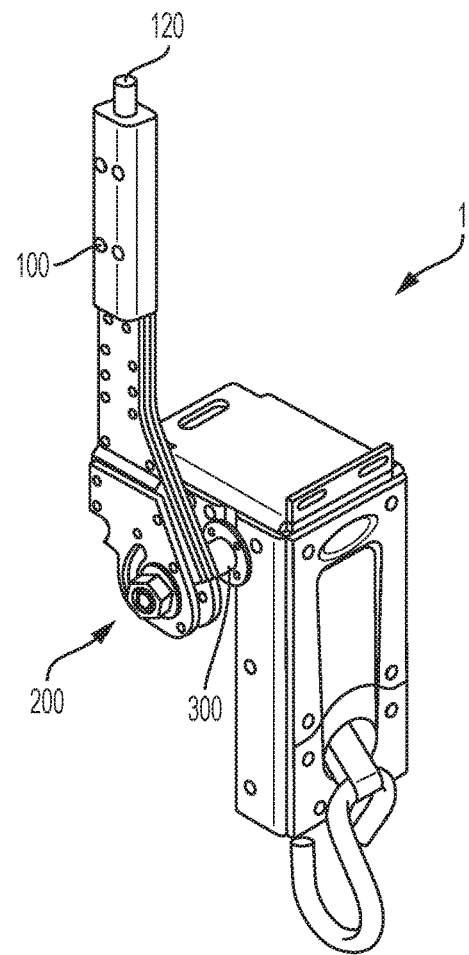
FIG. 1 is a perspective view of a first embodiment of a tensioner.
Figure 2:
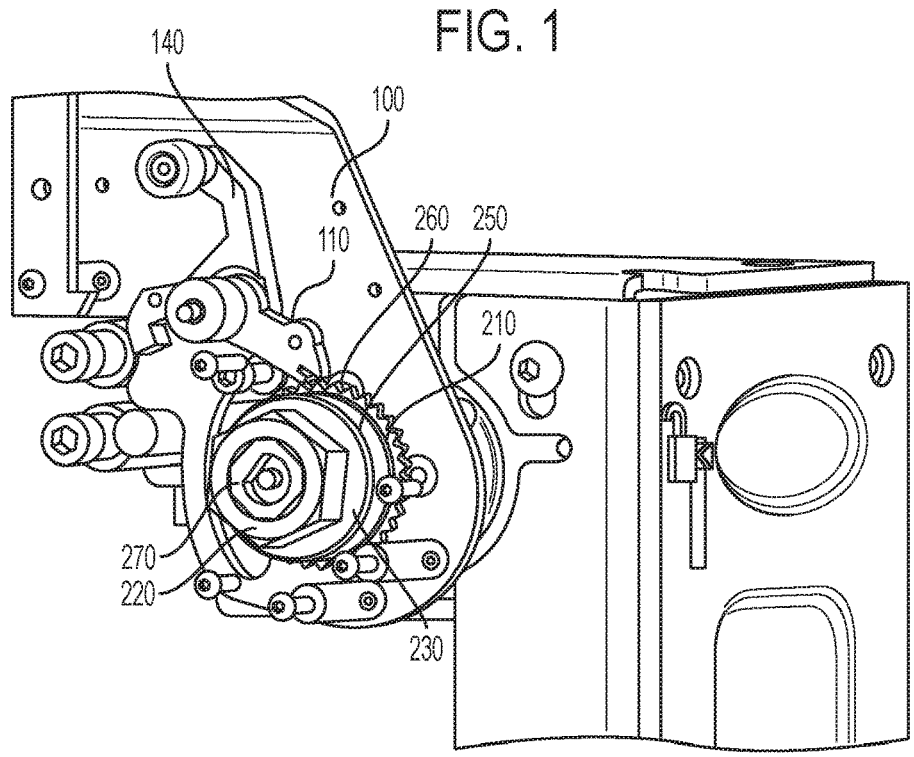
FIG. 2 is a second perspective view of the first embodiment showing the clutch mechanism.
Figure 3:
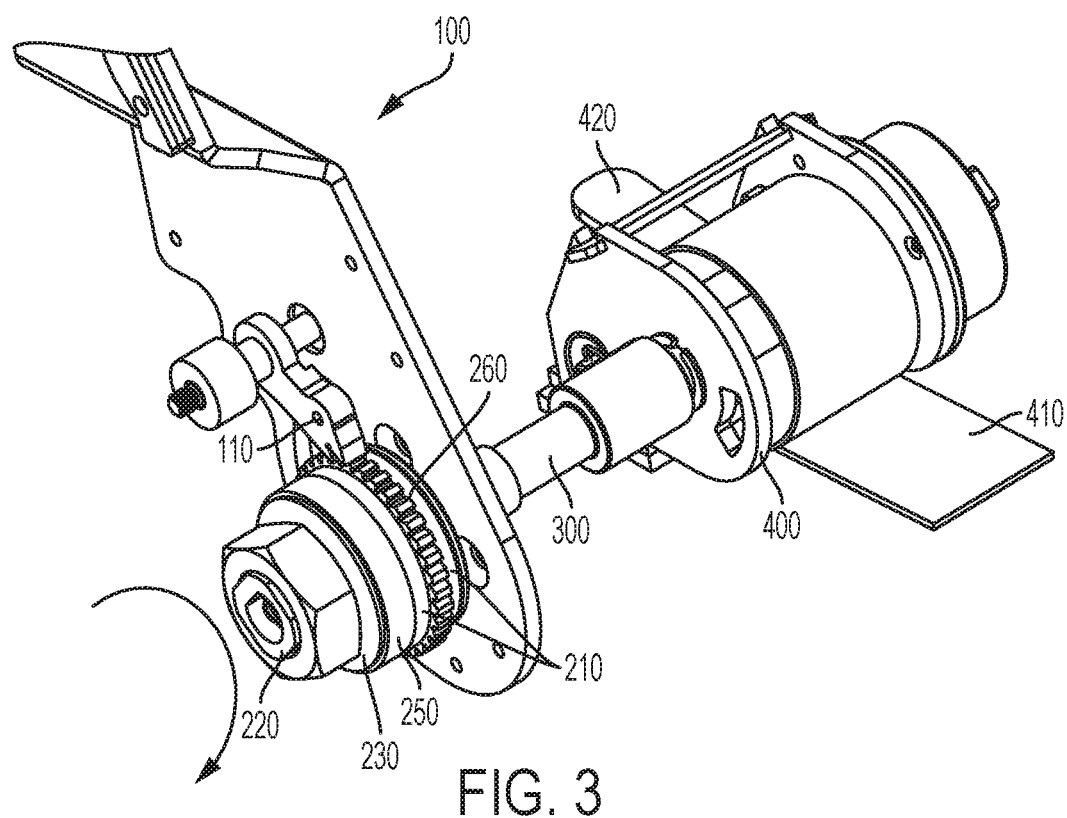
FIG. 3 is a third perspective view of the first embodiment showing additional components of the clutch mechanism.
Figure 4:
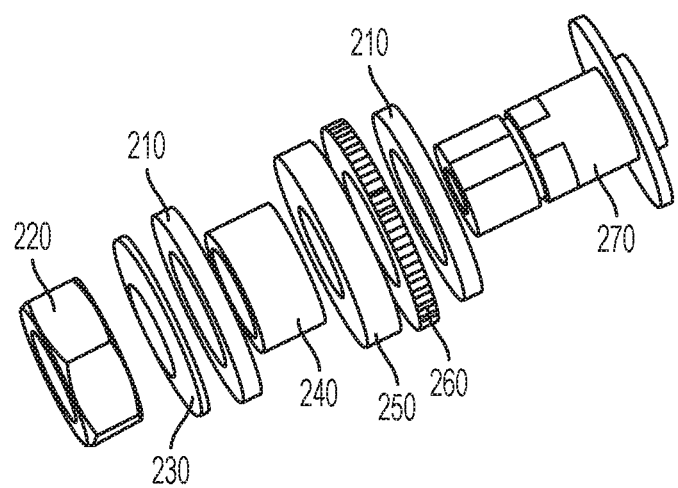
FIG. 4 is an exploded view of the clutch mechanism for the first embodiment.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

With reference to FIGS. 1-4, a first embodiment of a tensioner 1 and an associated clutch (or clutch assembly/mechanism) 200 is shown. The clutch assembly 200 is an automatic load limiting device that limits the torque applied to the connector shaft 300 by slipping of the drive sprocket 260 with respect to the drive hub 270. The range of torque is adjustable by the hex nut (compression member) 220 which applies a load of force to the friction discs (friction members) 210 thru the pressure plate 250. The frictional force couples the drive sprocket (drive member) 260 to the hub 270 which is connected to the drive shaft 300. As the handle 100 is rotated, the drive pawl 110 engages the drive sprocket 260 which causes the connector shaft 300 to rotate. Since the connector shaft 300 is coupled to the retractor 400 shaft, it will also rotate causing the webbing 410 to be wound into the retractor 400. As the webbing 410 is being wound into the retractor 400 while the end (not shown) is connected to a mobility device (not shown), a tension load develops on the webbing 410. As the web 410 load increases, the torque demand also increases until it is greater than the preset torque on the clutch 200 causing a slip between the sprocket 260 and friction discs 210. At this point, because the inner surface 265 of the sprocket 260 is not mechanically coupled to the hub 270 and can freely rotate relative to the hub 270, no additional torque can be applied and therefore no additional tension load on the web 410 can be achieved—the clutch 200 will just keep slipping.

Figure 5:
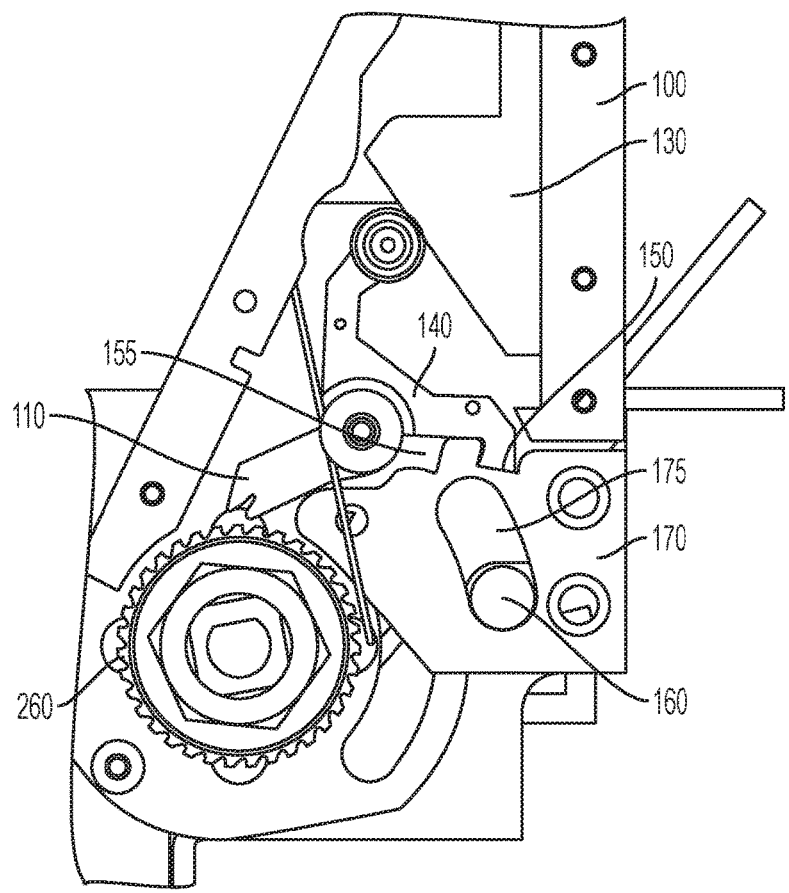
FIG. 5 is first side view of the first embodiment showing the release button mechanism in the stow mode.
Figure 6:
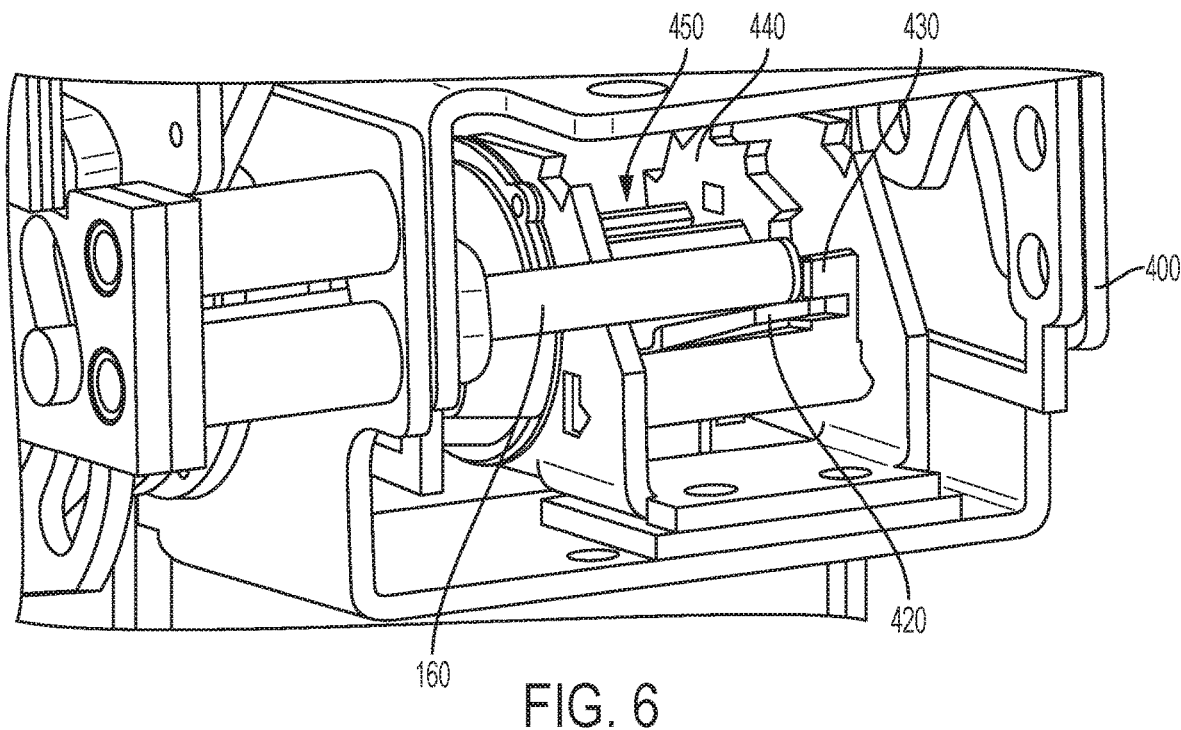
FIG. 6 is a fourth perspective view of the first embodiment showing internal components of the release button mechanism in the stow mode.

FIGS. 5-8 depict a release button mechanism for the first embodiment of the tensioner 1, which is operated by the release button at the top of the handle. When the handle 100 is in the stow position, as shown in FIGS. 5-6, the push cam 130 is in the up position and the lock/release arm 140 is in the first lock slot 150. At this point, the ratchet pawl 110 is held away from the clutch sprocket 260 by the control plate 170. At the same time, the retractor release shaft (retractor release member) 160 engages and pushes down the retractor pawl release arm 420, placing the retractor 400 in an unlocked state (allowing webbing 410 to be retracted and withdrawn).

Figure 7:
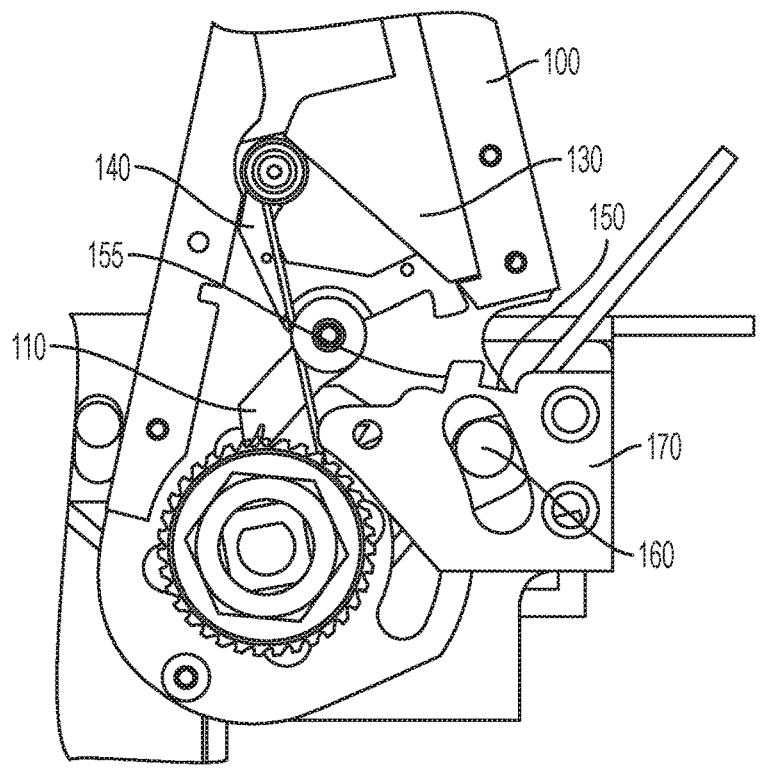
FIG. 7 is a second side view of the first embodiment showing the release button mechanism in transition from the stow mode to the tension mode.
Figure 8:
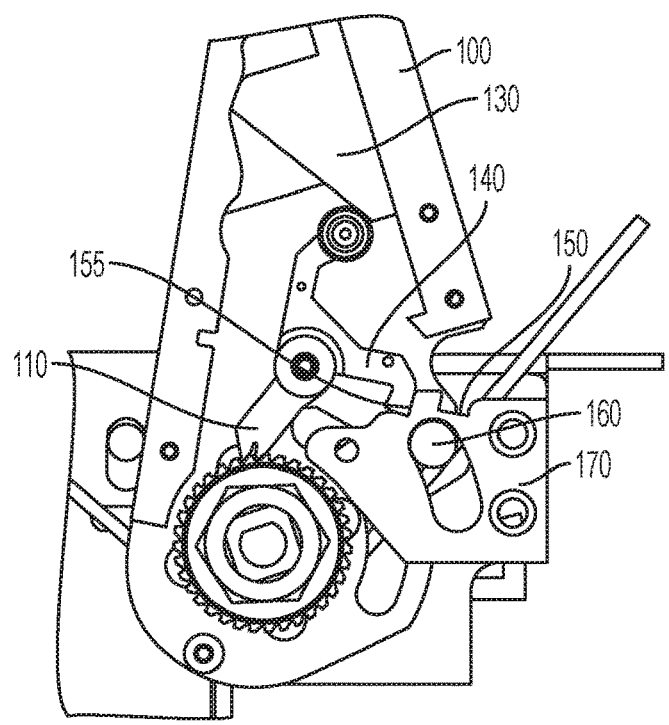
FIG. 8 is third side view of the first embodiment showing the release button mechanism in the tension mode.

FIG. 7 shows the release button mechanism in transition from the stow mode to the tension mode, while FIG. 8 shows the release button mechanism in the tension mode. When the release button 120 is pressed down, as shown in FIG. 7, the push cam 130 moves down and the lock/release arm 140 moves out from the first lock slot 150. As the handle 100 rotates forward and the push button 120 is released, as shown in FIG. 8, the push cam 130 moves up and the lock/release arm 140 engages the second lock slot 155. At this point, the retractor release shaft 160 moves up and out of engagement with the retractor pawl release arm 420. In that regard, the retractor 400 is placed in a locked mode where the retractor pawl 430 engages the retractor sprocket 440 (whereby webbing 410 can be retracted, but not withdrawn from the retractor spool 450). The ratchet pawl 110 engages the clutch 200, as shown in both FIGS. 7 and 8, and as the handle 100 is moved up and down tension is applied to the retractor 400 web 410.

Figure 9:
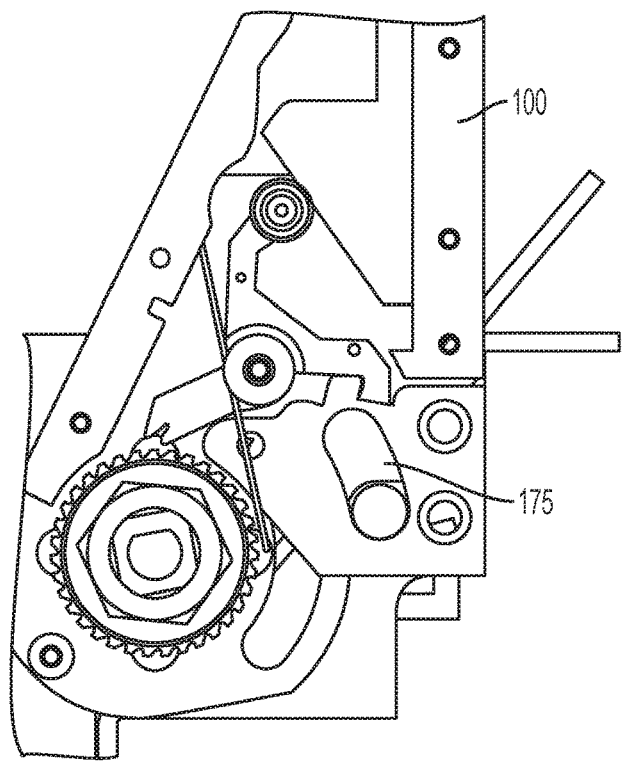
FIG. 9 is a fourth side view of the first embodiment showing the safety indication mechanism in the stow mode.
Figure 10:
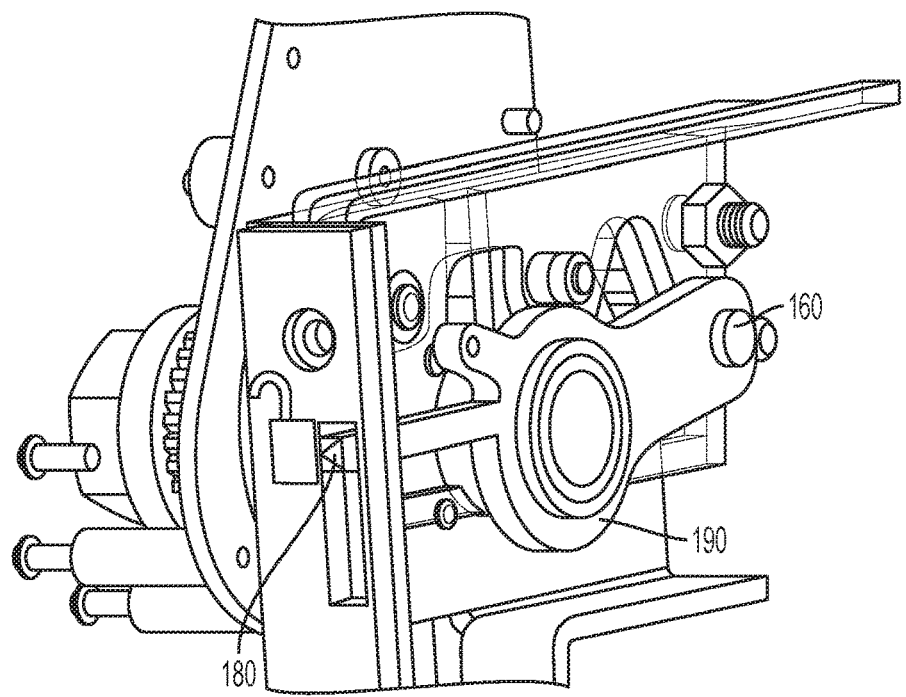
FIG. 10 a fifth perspective view of the first embodiment showing the safety indication mechanism in the stow mode.

FIGS. 9 and 10 show the operation of the safety indication mechanism of the first embodiment. When the handle 100 is in the stowed/release position (FIGS. 9 and 10), the retractor release shaft 160 is pushed down in the control plate slot 175 causing the lock indicator 180 to move up indicating that the handle 100 is in the stowed released position. When the handle 100 is moved to the lock/tension mode, the lock indicator 180 will move down as the lock indicator bracket 190 is spring loaded (i.e., forcing the retractor release shaft 160 upward into engagement with the top of the control plate slot 175).

Figure 11:
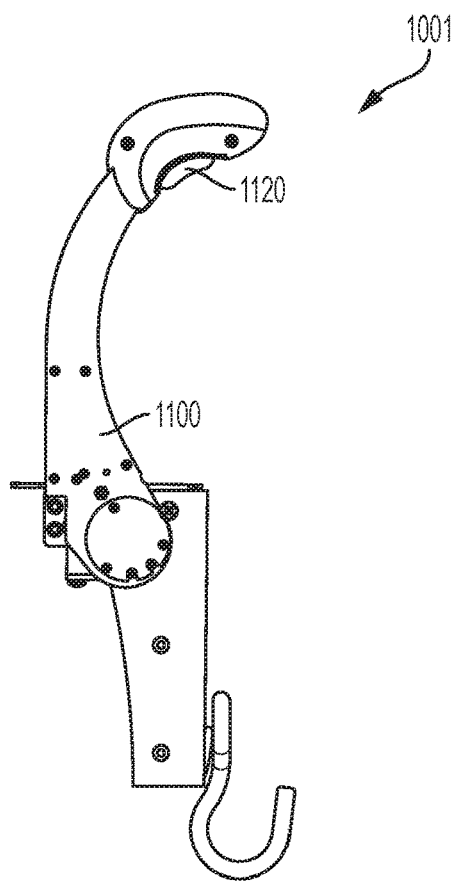
FIG. 11 is a first side view of a second embodiment of a tensioner in the stow mode.
Figure 12:
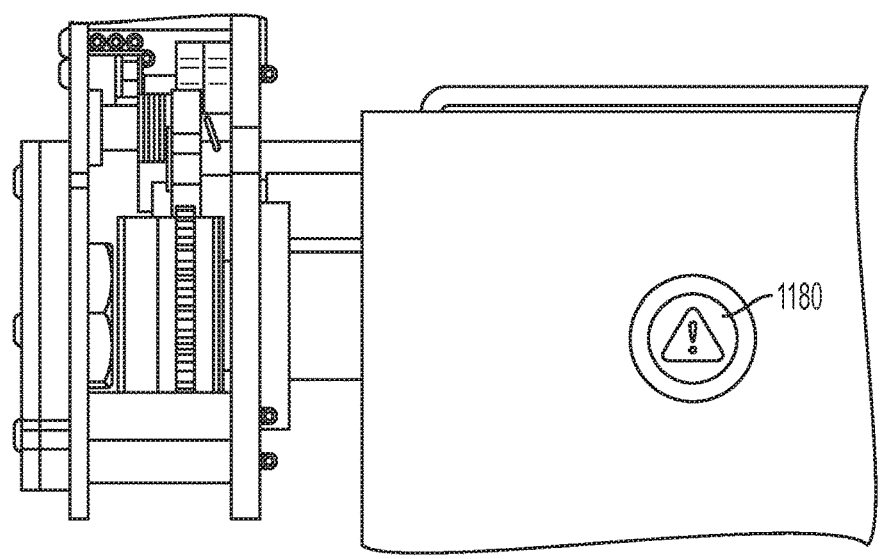
FIG. 12 is a first front view of the second embodiment in the stow mode.
Figure 13:
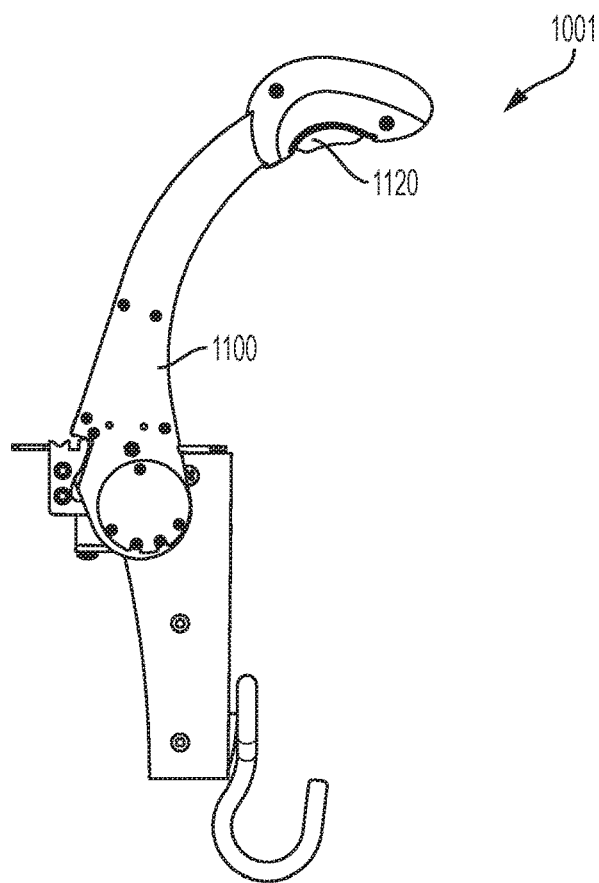
FIG. 13 is a second side view of the second embodiment in the tension mode.
Figure 14:
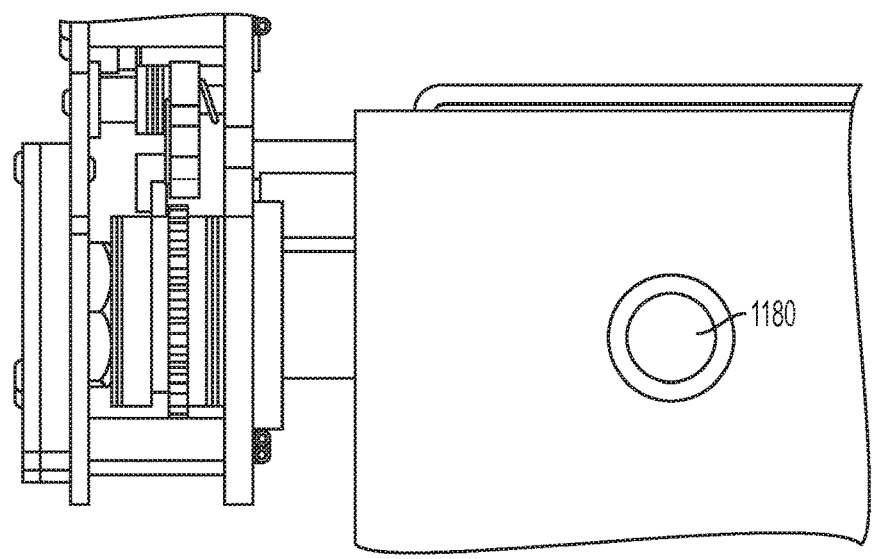
FIG. 14 is a second front view of the second embodiment in the tension mode.
Figure 15:
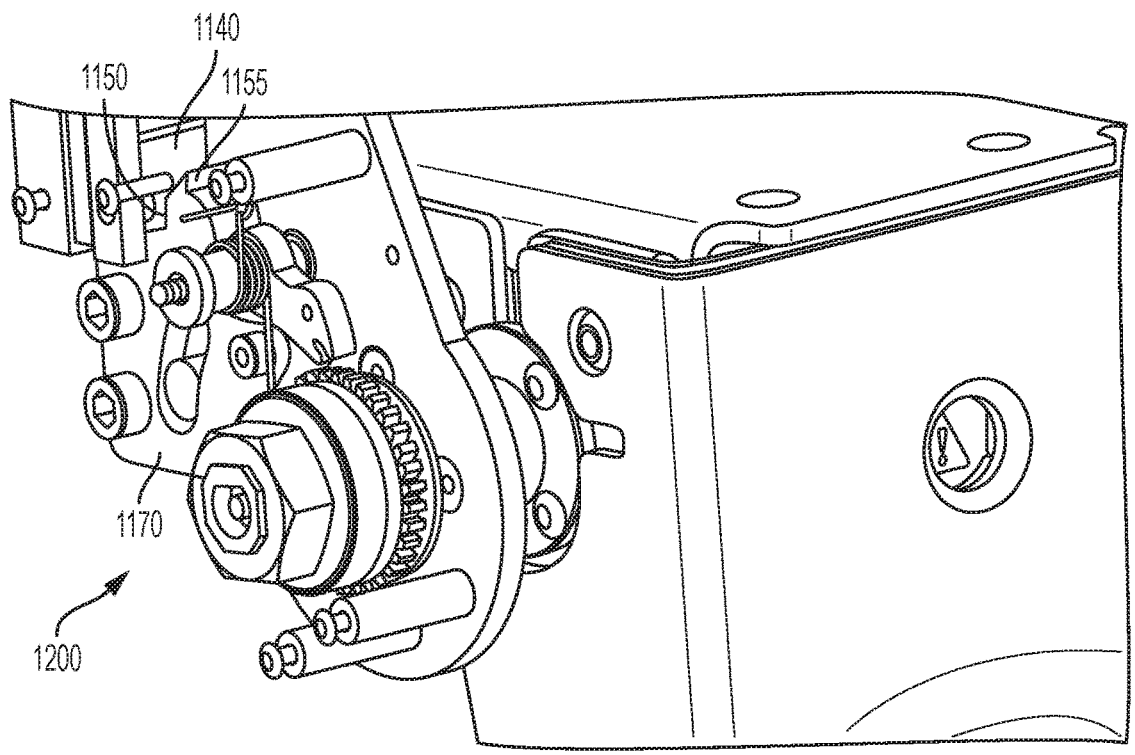
FIG. 15 is a first perspective view of the second embodiment showing the clutch mechanism; and, FIG. 16 is a second perspective view of the second embodiment showing the safety indication mechanism.

With reference to Figures to 11 to 16, a second embodiment of the tensioner 1001 is shown. FIGS. 11-12 show the tensioner 1001 in the Stow Mode, while FIGS. 13-14 show the tensioner 1001 in the Tension Mode. The safety indicator window 1180 reflects a released condition, as shown in FIG. 12, when the tensioner 1001 is in the Stow Mode. In large part, the clutch mechanism 1200 of the second embodiment is the same as that of the first embodiment. One major difference between the first and second embodiment relates to the release button mechanism. The second embodiment, as shown in FIG. 15, does not include a push button, but rather includes a trigger 1120 on the underside of the handle 1100. Squeezing the of the trigger 1120 lifts the lock member 1140, by way of a cable or similar component (not shown), out of a first lock slot 1150 in the control plate 1170, which allows the handle 1100 to be moved from the Stow Mode to the Tension Mode. Once the trigger 1120 is released, the lock member 1140 moves downward due to biasing by a spring (not shown) or the like. The lip 1155 in the control plate prohibits the handle 1100 from moving back to the Stow Mode until the trigger 1120 is squeezed such that the lock member 1140 lifts to clear the lip 1155.

Figure 16:
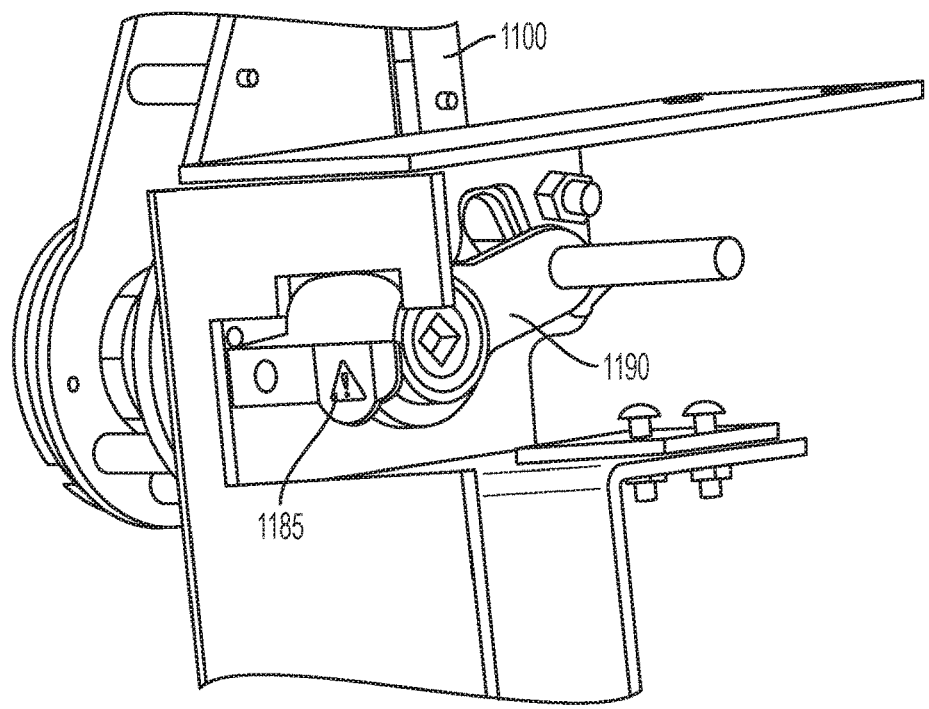

Another slight difference between the first and second embodiment is the lock indicator bracket 1190, which is shown in FIG. 16. As before, the lock indicator bracket 1190 is held in the position shown in FIG. 16 by the handle 1100. When the handle 1100 is moved to the Tension Mode, the lock indicator bracket 1190 is biased in a counter-clockwise direction (view from the angle shown in FIG. 27) such that the release indicator 1185 is not visible through the indicator window 1180.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A manual tensioner adapted for use with a retractor, the manual tensioner comprising:
    an elongated tensioning handle having a stow position and a tensioning position, wherein in the stow position the elongated tensioning handle is adapted to be mechanically disengaged from a spool of the retractor, and in the tensioning position the elongated tensioning handle is adapted to be mechanically engaged with the spool of the retractor whereby rotation of the elongated tensioning handle urges the spool to rotate;
    a lock having an unlocked state and a locked state, wherein in the unlocked state the lock permits the elongated tensioning handle to be selectively rotatable between the stow position and the tensioning position, and in the locked state the lock prevents the elongated tensioning handle from being selectively rotatable between the stow position and the tensioning position; and,
    a release button being disposed at a free end of the elongated tensioning handle, wherein the release button is configured to manipulate the lock into the unlocked state.

2. The manual tensioner of claim 1, further comprising the retractor.

3. The manual tensioner of claim 1, wherein the release button is selected from the group including a trigger button having a direction of travel that is transverse to a longitudinal axis of the elongated tensioning handle and a thumb button having a direction of travel that is parallel to a longitudinal axis of the elongated tensioning handle.

4. The manual tensioner of claim 1, wherein the lock is biased to the locked position.

5. The manual tensioner of claim 1, further comprising a cam surface and a cam follower, the cam surface being connected to one of the release button or the lock and the cam follower being connected to the other of the release button or the lock, wherein the cam surface and cam follower collective urge the lock into the unlocked state when the release button is triggered.

6. The manual tensioner of claim 1, wherein the release button and the lock are directly or indirectly connected.

7. The manual tensioner of claim 6, wherein the release button is connected to the lock by a cable.

8. The manual tensioner of claim 1, wherein the lock comprises a lock member, a first lock slot for receiving the lock member when the elongated tensioning handle is in the stow position, and a second lock slot for receiving the lock member when the elongated tensioning handle is in the tensioning position.

9. The manual tensioner of claim 8, wherein the first lock slot prevents rotation of the elongated tensioning handle and the second lock slot permits rotation of the elongated tensioning handle.

10. The manual tensioner of claim 8, whereby the first lock slot is separated from the second lock slot by a lip, wherein when the elongated tensioning handle is in the stow position and the release button is not triggered the lock member is disposed in the first lock slot and the lip abuts the lock member to prevent the elongated tensioning handle from rotating to the tensioning position, and when the elongated tensioning handle is in the tensioning position and the release button is not triggered the lock member is disposed in the second lock slot and the lip abuts the lock member to prevent the elongated tensioning handle from rotating to the stow position.

11. The manual tensioner of claim 10, wherein when the release button is triggered the lock member is positioned above the lip whereby the elongated tensioning handle can be rotated between the stow position and the tensioning position.

12. A manual tensioner adapted for use with a retractor, the manual tensioner comprising:
   an elongated tensioning handle being selectively moveable between a stow position and a tensioning position, wherein in the stow position the elongated tensioning handle is adapted to be mechanically disengaged from a spool of the retractor, and in the tensioning position the elongated tensioning handle is adapted to be mechanically engaged with the spool of the retractor whereby rotation of the elongated tensioning handle urges the spool to rotate;
   a condition indicator, the condition indicator having at least a first position and a second position, wherein when moved to the stow position the elongated tensioning handle moves the condition indicator to the second position.

13. The manual tensioner of claim 12, wherein the condition indicator is biased to the first position.

14. The manual tensioner of claim 12, wherein in the second position the condition indicator reflects an unsafe condition.

15. The manual tensioner of claim 12, further comprising a retractor release member having at least a first position and a second position, wherein when moved to the stow position the elongated tensioning handle moves the retractor release member to the second position.

16. The manual tensioner of claim 15, wherein the retractor release member is biased to the first position.

17. The manual tensioner of claim 15, wherein in the second position the retractor release member triggers a retractor release for the retractor.

18. A manual tensioner adapted for use with a retractor, the manual tensioner comprising:
   an elongated tensioning handle being selectively moveable between a stow position and a tensioning position, wherein in the stow position the elongated tensioning handle is adapted to be mechanically disengaged from a spool of the retractor, and in the tensioning position the elongated tensioning handle is adapted to be mechanically engaged with the spool of the retractor whereby rotation of the elongated tensioning handle urges the spool to rotate;
   a hub including and holding a retractor release member and a condition indicator, the hub having at least a first position and a second position, the hub being biased to the first position, wherein when moved to the stow position the elongated tensioning handle engages a portion of the hub and moves it to the second position.

19. The manual tensioner of claim 18, wherein the condition indicator reflects an unsafe condition when the hub is in the second position.

20. The manual tensioner of claim 18, wherein the retractor release member triggers a retractor release for the retractor when the hub is in the second position.

* * * * *